(12) United States Patent
Hirota

(10) Patent No.: US 6,209,317 B1
(45) Date of Patent: Apr. 3, 2001

(54) EXHAUST GAS PURIFYING APPARATUS FOR INTERNAL COMBUSTION ENGINE

(75) Inventor: Shinya Hirota, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/295,471

(22) Filed: Apr. 19, 1999

(30) Foreign Application Priority Data

May 15, 1998 (JP) ................................. 10-134088

(51) Int. Cl.⁷ ...................................................... F01M 3/00
(52) U.S. Cl. .................................................. 60/297; 60/278
(58) Field of Search .............................. 60/297, 278, 295, 60/301, 288, 279, 284

(56) References Cited

U.S. PATENT DOCUMENTS

| | | | |
|---|---|---|---|
| 5,448,887 | * 9/1995 | Takeshima | 60/278 |
| 5,544,482 | * 8/1996 | Matsumoto et al. | 60/279 |
| 5,560,201 | * 10/1996 | Fujishita et al. | 60/279 |
| 5,584,177 | * 12/1996 | Oketani et al. | 60/284 |
| 5,711,149 | * 1/1998 | Araki | 60/278 |

FOREIGN PATENT DOCUMENTS

| | | |
|---|---|---|
| 41617 U | 1/1992 | (JP) . |
| 61146869 | 5/1994 | (JP) . |
| 61185342 | 7/1994 | (JP) . |

* cited by examiner

Primary Examiner—Teresa Walberg
Assistant Examiner—Quang Van
(74) Attorney, Agent, or Firm—Kenyon & Kenyon (57) ABSTRACT

An exhaust gas purifying apparatus including an HC absorbent located in an upstream region of a selective reduction type NOx catalyst for improving a NOx purification efficiency. In the exhaust gas purifying apparatus, an HC absorbing device is disposed upstream of a NOx catalyst converter arranged in an exhaust gas passageway. The selective reduction type NOx catalyst accommodated in the HC absorbing device uses a carrier, which is easy to absorb the HC when a temperature of the exhaust gas is lowered, and easy to desorb the HC when the temperature of the exhaust gas is raised, and a selective reduction type NOx catalyst accommodated in the NOx catalyst converter uses a carrier which has a strong absorption of HC for retention. In order to prevent a catalyst temperature of the NOx catalyst converter from being lowered to a temperature lower than a purification temperature window in an operating state of deceleration, an ECU corrects an opening degree of an EGR valve to be increased, and thereby a flow rate of the exhaust gas which flows into the NOx catalyst converter is decreased when an inlet gas temperature detected by an inlet gas temperature sensor is lowered to a temperature lower than a set temperature. Thus, lowering of the catalyst temperature is suppressed.

2 Claims, 5 Drawing Sheets

FIG. 5 ion combustion at a lean air-fuel ratio (for example, a diesel engine or a lean burn gasoline engine).

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus which purifies a NOx in an exhaust gas of an internal combustion engine which is capable of performing combustion at a lean air-fuel ratio.

2. Description of the Related Art

A selective reduction type NOx catalyst which reduces or decomposes the NOx in the presence of hydrocarbon in an ambient atmosphere with excessive oxygen is widely used in the exhaust gas purifying apparatus which purifies the NOx in the exhaust gas of the internal combustion engine which is capable of performing combustion a lean air-fuel ratio (for example, a diesel engine or a lean burn gasoline engine).

A reductant (for example, hydrocarbon (HC)) is required in purification of NOx by the selective reduction type NOx catalyst and therefore, the exhaust gas purifying apparatus of this kind comprises means for supplying a reductant to the selective reduction type NOx catalyst.

An exhaust gas purifying apparatus has been disclosed in Japanese Patent Application Laid-Open No. 6-185342, in which apparatus a HC absorbent which absorbs and desorbs HC is located at an upstream position of the selective reduction type NOx catalyst which is disposed in an exhaust gas passageway in the internal combustion engine, the HC is absorbed by the HC absorbent when a temperature of the exhaust gas is low, while the HC is desorbed from the HC absorbent when the temperature of the exhaust gas is high and the desorbed HC is supplied to the selective reduction type NOx catalyst, so that the NOx is purified.

In the mean time, the selective reduction type NOx catalyst has a purification temperature window which is an optimal range for NOx purification, and when the catalyst temperature is outside this purification temperature window, the NOx purification efficiency is greatly reduced or the catalyst exerts no purification ability. The purification temperature window is as narrow as, for example, a range from 200 to 300βC. and, when the selective reduction type NOx catalyst is used as a catalyst in the exhaust gas purifying apparatus for the internal combustion engine of a vehicle, a temperature of the selective reduction type NOx catalyst has a chance to be outside the purification temperature window when the vehicle is in an operating state of deceleration. On the other hand, when the vehicle is in the operating state of acceleration, not only a great quantity of NOx is produced in the exhaust gas of the internal combustion engine but also an exhaust gas temperature is raised high and, then if the high temperature exhaust gas flows into the HC absorbent located upstream, the HC which has been absorbed in the HC absorbent is desorbed from the HC absorbent and flows into the selective reduction type NOx catalyst located downstream.

On many occasions, the operating state of the vehicle frequently changes between acceleration and deceleration alternately when, for example, running through the streets of a city, and in many cases the vehicle is in the decelerator state immediately before the accelerating operation. When the vehicle operating state is of deceleration and thereby the catalyst temperature of the selective reduction type NOx catalyst is outside the purification temperature window, if the operating state is changed from deceleration to acceleration, a high temperature exhaust gas begins to flow into the HC absorbent immediately after the acceleration operation has started. Therefore, the HC which has been absorbed in the HC absorbent is desorbed and flows into the selective reduction type NOx catalyst, but the catalyst temperature of the selective reduction type NOx catalyst has not been raised yet at a time immediately after the acceleration and it is still outside the purification temperature window, so that the NOx is not purified, and the HC which flows into the selective reduction type NOx catalyst is not utilized for purification of NOx, but merely flows through the catalyst without any effective use thereof.

As described above, the NOx is generated in great quantity in the exhaust gas during the acceleration operation, and the NOx purification should be essentially started immediately after acceleration and from this view point, the conventional exhaust gas purifying apparatus for the internal combustion engine has had a room for further improvement.

SUMMARY OF THE INVENTION

The present invention has been made in the light of such a technical problem of the conventional art, and it is an object of the present invention to improve the NOx purification performance of an exhaust gas purifying apparatus by controlling a catalyst temperature of a selective reduction type NOx catalyst to remain within a purification temperature window even when a load on an internal combustion engine is reduced.

The present invention has adopted the following means in order to solve the problem. The present invention provides an exhaust gas purifying apparatus for an internal combustion engine in which a selective reduction type NOx catalyst which reduces or decomposes NOx in the presence of hydrocarbon in an ambient atmosphere with excessive oxygen is provided in an exhaust gas passageway and an absorbent which absorbs and desorbs a reductant is also provided in an upstream region of the selective reduction type NOx catalyst, wherein the exhaust gas purifying apparatus comprises catalyst temperature lowering suppression means for suppressing lowering of the temperature of the selective reduction type NOx catalyst when a load on the internal combustion engine is reduced.

When the load on the engine is reduced, the catalyst temperature lowering suppression means suppresses lowering of the catalyst temperature of the selective reduction type NOx catalyst and thereby the catalyst temperature does not fall the outside of the purification temperature window. When the load on the internal combustion engine is reduced, the exhaust gas temperature is lowered, and, consequently, the absorbent absorbs the reductant when the exhaust gas flows into the absorbent. On the other hand, when the load on the internal combustion engine is increased, the exhaust gas temperature is raised, and this exhaust gas flows into the absorbent, the reductant which has been absorbed in the absorbent is desorbed and then flows into the selective reduction type NOx catalyst located downstream. At this time, the catalyst temperature of the selective reduction type NOx catalyst is within the purification temperature window, and, therefore, the selective reduction type NOx catalyst is being activated. Then, the NOx is produced in great quantity when the load on the internal combustion engine is increased, and this NOx is purified by reduction or decomposition by the reductant desorbed from the absorbent and the reductant which is absorbed in the selective reduction type NOx catalyst.

The internal combustion engine in the present invention is an internal combustion engine which is capable of performing combustion at a lean air-fuel ratio and can be exemplified by a diesel engine or a lean burn gasoline engine.

For the absorbent described above, the selective reduction type NOx catalyst can be used, but the absorbent is not limited to this catalyst.

The state of reduced load on the internal combustion engine corresponds to, for example, the deceleration operation in the case of the internal combustion engine for a vehicle.

The catalyst temperature lowering suppression means can be constituted of exhaust gas flow rate limiting means for suppressing a flow rate of the exhaust gas which flows into the selective reduction type NOx catalyst. Lowering of the catalyst temperature of the selective reduction type NOx catalyst can be suppressed by decreasing a flow rate of the exhaust gas which flows into the selective reduction type NOx catalyst. Besides, the catalyst temperature lowering suppression means can be constituted of an electric heater.

A carrier for the selective reduction type NOx catalyst is preferably not to desorb the reductant easily than a carrier of the absorbent. Then with such a carrier, when the load on the engine is increased, the reductant which was desorbed from the absorbent and the reductant which is absorbed in the selective reduction type NOx catalyst contribute to reductive purification of NOx, and the NOx which is generated in great quantity at the time of increasing the load on the engine can be purified by reduction with certainty.

DETAILED DESCRIPTION OF THE PREFERRED EMBODIMENTS

Preferred embodiments of an exhaust gas purifying apparatus for an internal combustion engine according to the present invention will be described with reference to FIG. 1 to FIG. 5. Here, in the embodiments described below, a diesel engine for a vehicle is applied as an internal combustion engine.

[First Embodiment]

Figure 1:
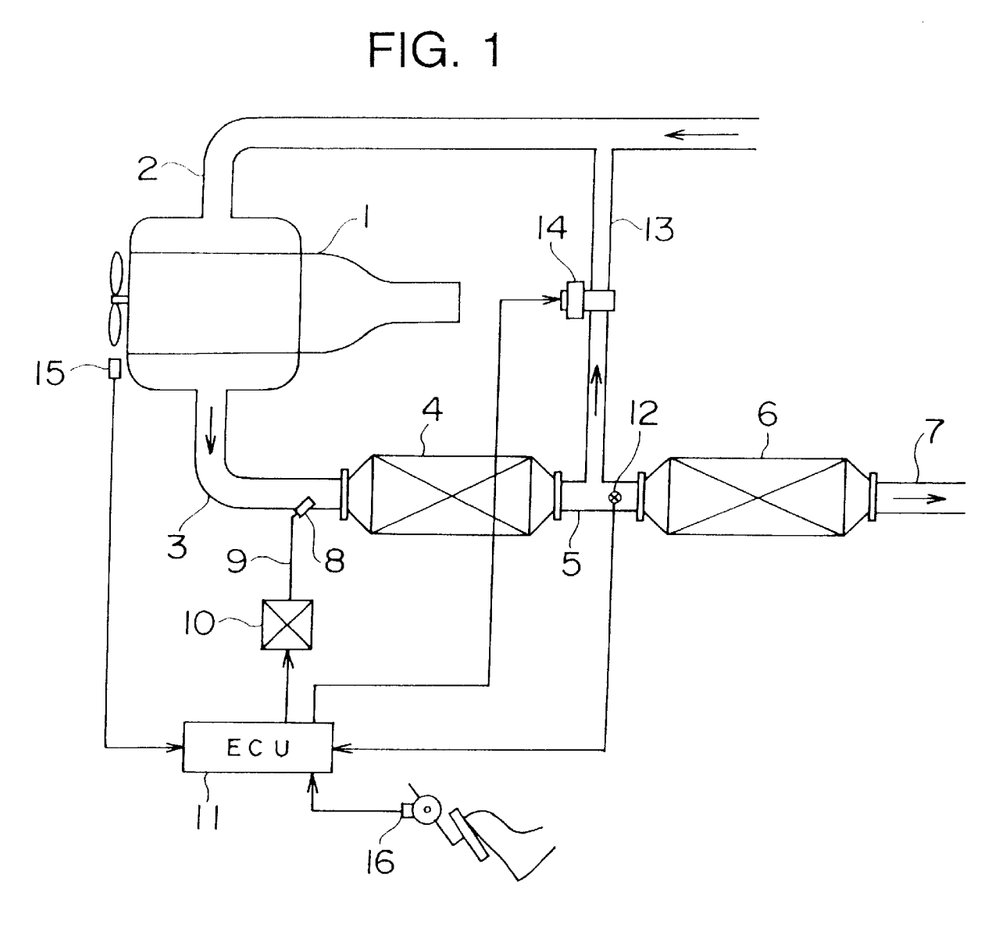
FIG. 1 is a schematic diagram showing a configuration of an exhaust gas purifying apparatus for an internal combustion engine in a first embodiment of the present invention.

FIG. 1 is a schematic diagram showing a configuration of an exhaust gas purifying apparatus for an internal combustion engine in a first embodiment. Air is introduced into a combustion chamber of each cylinder of a diesel engine (an internal combustion engine) 1 for a vehicle through an air intake pipe 2, and a fuel is injected into the combustion chamber from an unillustrated fuel injection, and burnt therein.

An exhaust gas emitted from the combustion chamber of each cylinder is discharged into the outside air through an exhaust pipe 3, an HC absorbing device (absorbent) 4, an exhaust pipe 5, a NOx catalyst converter 6, and an exhaust pipe 7. Selective reduction type NOx catalysts are respectively accommodated in the HC absorbing device 4 and the NOx catalyst converter 6, the details of which will be described later.

The exhaust pipe 3 is provided with an injection nozzle 8 for injecting a light oil, which is the fuel for the engine 1, as a reductant into the exhaust gas. The injection nozzle 8 is connected with a reductant supply device 10 which includes a pump and the like, via a reductant supply pipe 9 and operation of the reductant supply device 10 is controlled by an electronic control unit for engine control (hereinafter abbreviated as ECU) 11 according to an operating state of the engine 1. Specifically, an amount of NOx content in the exhaust gas of the engine 1 can be predicted based on the operating state of the engine land therefore, a quantity of the reductant necessary for purification of the NOx is also predictive. Hence, the relationship therebetween is compiled into a map and the map is stored in a ROM of the ECU 11 in advance. The ECU 11 reads out a necessary reductant quantity referring to the map according to the operating state of the engine 1 and controls the operation of the reductant supply device 10 so that the quantity of the reductant is injected through the injection nozzle 8.

Reductant adding means can be realized by injection of light oil into the cylinder in an explosion stroke of the engine 1, namely, so-called an explosion stroke injection, instead of injection of light oil into the exhaust pipe 3 from the injection nozzle 8.

The exhaust pipe 5 is provided with an inlet gas temperature sensor 12 for detecting a temperature of the exhaust gas which flows into the NOx catalyst converter 6, and the inlet gas temperature sensor 12 sends out an output signal proportional to the detected inlet gas temperature to the ECU 11.

The air intake pipe 2 and the exhaust pipe 5 are connected with each other through an exhaust gas recycling pipe 13, and this exhaust gas recycling pipe 13 includes an exhaust gas recycling control valve (hereinafter abbreviated as EGR valve) 14 disposed therein. An opening degree of the EGR valve 14 is controlled by the ECU 11 according to the operating state of the engine 1, and the exhaust gas is recycled from the exhaust pipe 5 to the air intake pipe 2 in a flow rate corresponding to an opening degree of the EGR valve.

The ECU 11 is constructed of a digital computer, and comprises: a ROM (read only memory); a RAM (random access memory); a CPU (central processor unit); an input port and an output port, which are all connected by a bi-directional bus, and performs not only the fundamental control such as fuel injection rate control of the engine 1, but also, in this embodiment, performs catalyst temperature control of the NOx catalyst converter 6 and the like.

For such controls described above, the input port of the ECU 11 is supplied, as input, with an input signal from the inlet gas temperature sensor 12, in addition to this an input signal from a rotational speed sensor 15 and an input signal from an accelerator opening degree sensor 16. The rotational speed sensor 15 sends out, as output, an output signal corresponding to the rotational speed of the engine 1 to the ECU 11, and the ECU 11 calculates an engine rotational speed based on the output signal. The accelerator opening degree sensor 16 sends out, as output, an output signal corresponding to an accelerator opening degree to the ECU 11 and the ECU 11 calculates an engine load based on the output signal.

As described above, the selective reduction type NOx catalysts are respectively accommodated in the HC absorbing device 4 and the NOx catalyst converter 6. But, the selective reduction type NOx catalyst accommodated in the HC absorbing device 4 and the selective reduction type NOx catalyst accommodated in the NOx catalyst converter 6 have different carriers from each other, and thereby performances thereof are different from each other.

The selective reduction type NOx catalyst accommodated in the HC absorbing device 4 uses a carrier (for example, ZSM-5 having a three-dimensional porous structure) which is easy to absorb the HC when the temperature is lowered, and easy to desorb the HC when the temperature is raised and an exhaust gas flow velocity (a space velocity) is high. Since the catalyst temperature of the selective reduction type NOx catalyst in the HC absorbing device 4 receives influences of the exhaust gas temperature and the exhaust gas flow velocity to a great extent, the temperature has many chances to fall outside the purification temperature window. Hence, the HC absorbing device 4 has almost no NOx purification capability. The selective reduction type NOx catalyst accommodated in the HC absorbing device 4 functions mainly as the HC absorbent which absorbs the HC when the temperature is lowered and desorbs the HC when the temperature is raised.

On the other hand, the selective reduction type NOx catalyst accommodated in the NOx catalyst converter 6 uses a carrier with a stronger absorption of HC for retention (for example, a mordenite which has a two-dimensional porous structure) than the carrier of the selective reduction type NOx catalyst in the HC absorbing device 4. The selective reduction type NOx catalyst accommodated in the NOx catalyst converter 6 functions as a NOx purifying agent, and the catalyst temperature of the NOx catalyst converter 6 in the exhaust gas purifying apparatus is controlled so as to fall within the purification temperature window even when the vehicle is in the operating state of deceleration in order to enable the NOx purification capability to be sufficiently exerted. Hereinafter, this control will be described in detail with reference to a flow chart of FIG. 2.

Figure 2:
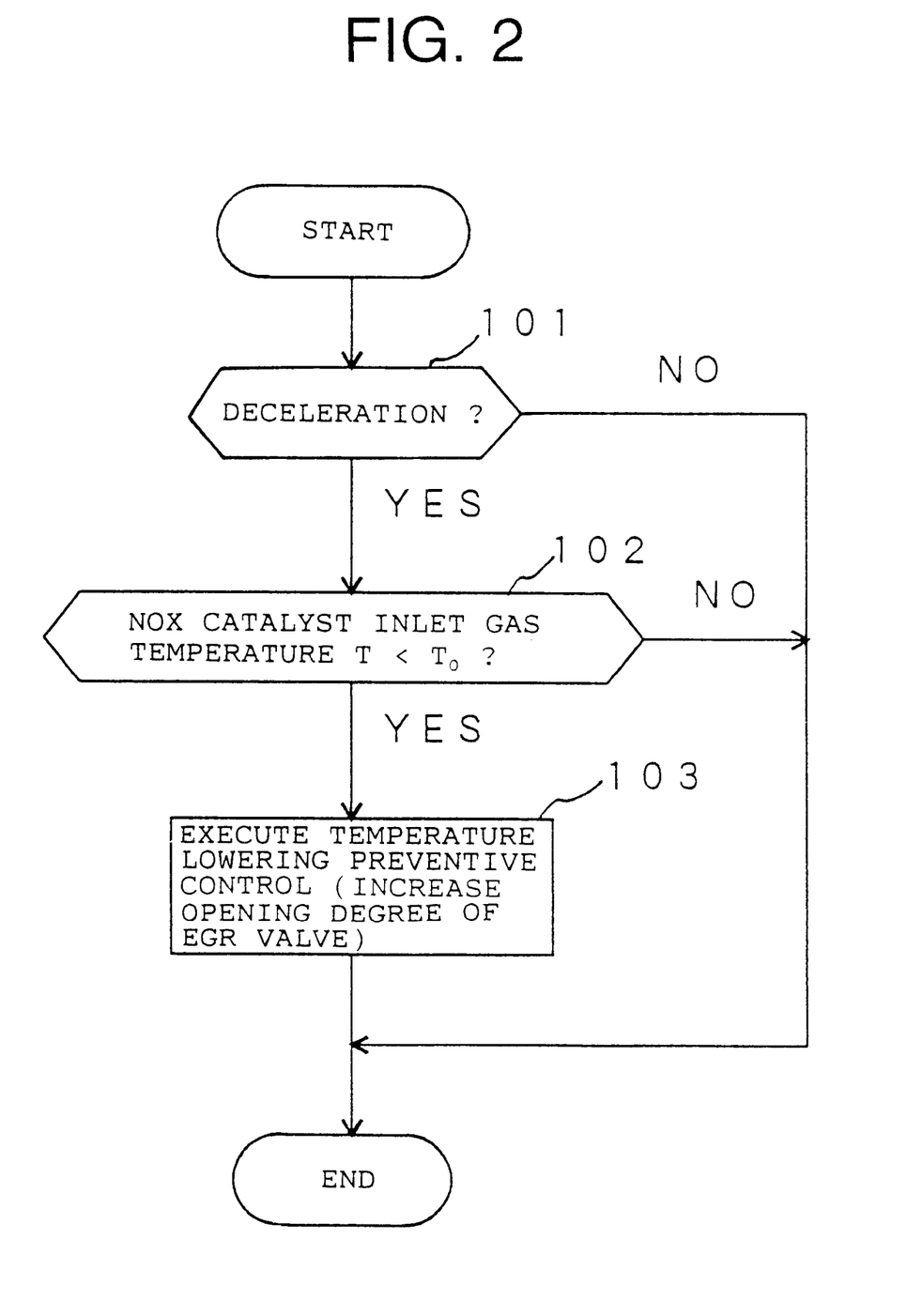
FIG. 2 is a flow chart showing catalyst temperature control procedures in the exhaust gas purifying apparatus for the internal combustion engine in the first embodiment.
Figure 3:
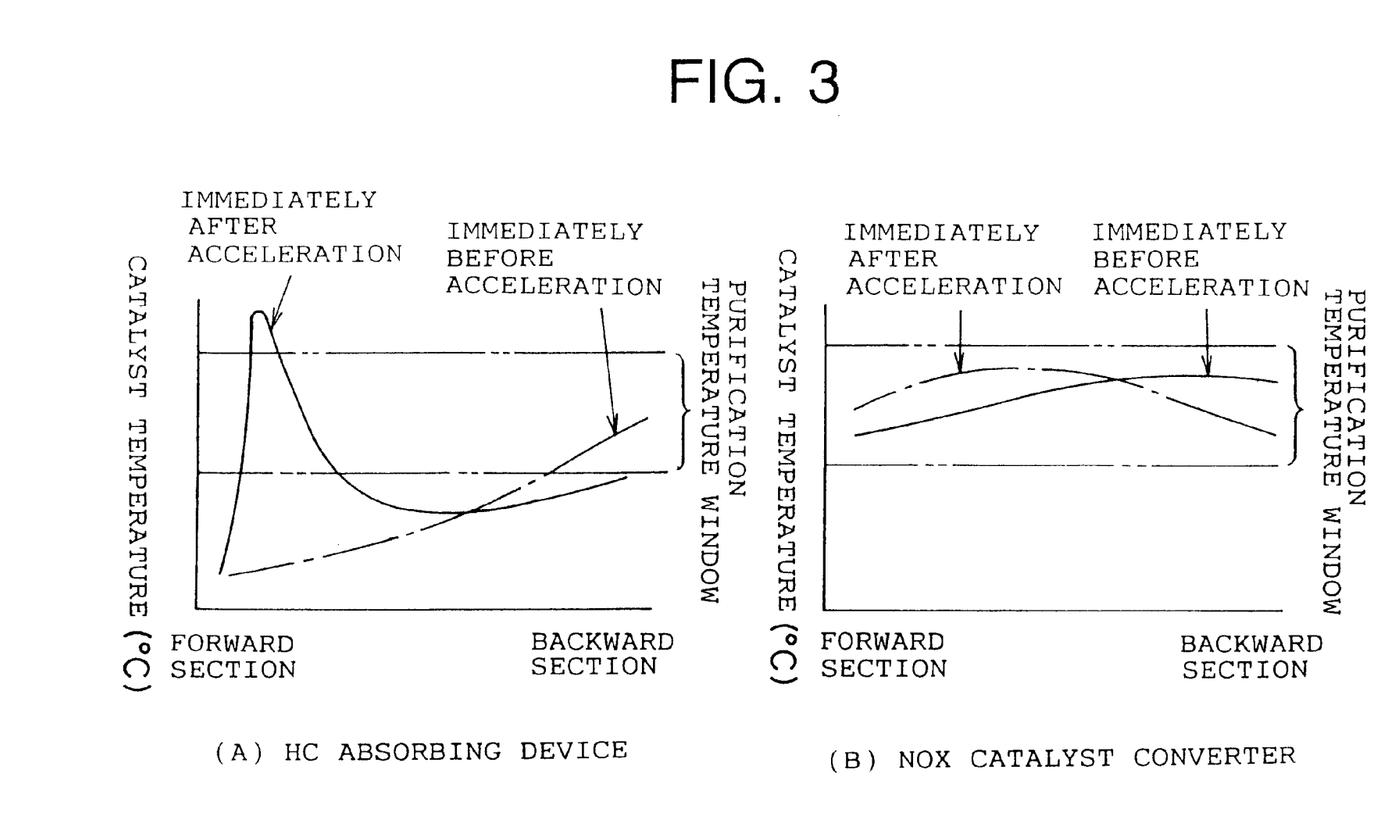
FIGS. 3(A), 3(B) are graphs showing catalyst temperature distributions in an HC absorbing device and a NOx catalyst converter in the exhaust gas purifying apparatus for the internal combustion engine in the first embodiment.

A routine for catalyst temperature control shown in FIG. is executed by the ECU 11 every time when a crankshaft is rotated to a certain angle of a plurality of predetermined angles. First of all, in step 101, the ECU 11 determines whether or not the vehicle is in the operating state of deceleration based on a change in the output signal of the accelerator opening degree sensor 16. That is, it is determined that the vehicle is in the operating state of deceleration when the accelerator opening degree changes in a decreasing direction, while it is determined that the vehicle is not in the operating state of deceleration when the accelerator opening degree does not change in the decreasing direction.

In step 101, when it is determined that the vehicle is in the operating state of deceleration, the ECU 11, in step 102. determines whether or not an inlet gas temperature T of the NOx catalyst converter 6 is lower than a set temperature $T_0$ based on the output signal of the inlet gas temperature sensor 12. Here, the set temperature $T_0$ is a value which is determined based on the purification temperature window of the selective reduction type NOx catalyst accommodated in the NOx catalyst converter 6 and the set temperature $T_0$ is set to be higher than the lower limit value of the purification temperature window by a predetermined temperature difference. For example, when the purification temperature window is from 200 to 300° C., the set temperature $T_0$, for example, is set at 250° C.

In step 102, when the inlet temperature T is determined to be lower than the set temperature $T_0$, the ECU 11, in step 103, executes correction control to increase the opening degree of the EGR valve 14. When the opening degree of the EGR valve 14 is increased, the exhaust gas recycling flow rate is increased and the flow rate of the exhaust gas which flows into the NOx catalyst converter 6 is decreased. As a result, lowering of the catalyst temperature of the catalyst converter 6 is suppressed. Then, the opening degree of the EGR valve 14 is subjected to feed back control based on the output signal of the inlet gas temperature sensor 12 and thereby, the catalyst temperature of the NOx catalyst converter 6 can be confined within the purification temperature window. Thus, the catalyst temperature of the NOx catalyst converter 6 can be confined within the purification temperature window even when the vehicle is in the operating state of deceleration.

In step 101, when it is determined that the vehicle is not in the operating state of deceleration, and in step 102 when it is determined that the inlet gas temperature T of the NOx catalyst converter 6 is equal to or higher than the set temperature $T_0$, the ECU 11 terminates this routine without execution of the correction of increasing the opening degree of the EGR valve 14 (step 103).

In this embodiment, the exhaust gas flow rate limiting means (catalyst temperature lowering suppression means) is realized by a combination of the exhaust gas recycling pipe 13, the EGR valve 14 and execution of step 103 among a series of signal processing by the ECU 11.

FIGS. 3(A), 3(B) show examples respectively of catalyst temperature distributions in the HC absorbing device 4 and the NOx catalyst converter 6, immediately before and immediately after the acceleration, when the catalyst temperature control in the operating state of deceleration is executed as described above. Here, the term "immediately before" means a terminal point of the deceleration operation. As can be seen from the drawings, in the HC absorbing device 4, the region wherein the catalyst temperature falls within the purification temperature window is very small at both immediately before and immediately after the acceleration, while in the NOx catalyst converter 6, the catalyst temperature is within the catalyst temperature window at both immediately before and immediately after the acceleration.

Next, the operation of the exhaust gas purifying apparatus with the above described arrangement will be described. When the vehicle is in the operating state of deceleration, the temperature of the exhaust gas is lowered. Therefore, the HC in the exhaust gas and part of HC in the reductant are absorbed in the selective reduction type NOx catalyst in the HC absorbing device 4, and the rest of HC and the reductant, which are not absorbed, flow into the NOx catalyst converter 6 located downstream. Further, the above described catalyst temperature control is executed in the operating state of deceleration and thereby, the catalyst temperature of the NOx catalyst converter 6 is confined within the purification temperature window. Since the quantity of NOx generated in the operating state of deceleration is small, the NOx in the exhaust gas can be reduced or decomposed by the selective reduction type NOx catalyst in the NOx catalyst converter 6 solely with the reductant which has passed through the HC absorbing device 4, even if only a portion of HC in the reductant is absorbed in the HC absorbing device 4.

Thereafter, when the vehicle changes the operating state from deceleration to acceleration, the temperature of the exhaust gas increases, and therefore, the HC which is absorbed in the selective reduction type NOx catalyst in the HC absorbing device 4 is desorbed and flows into the NOx catalyst converter 6 located downstream together with the reductant injected from the injection nozzle 8. As described above, even immediately after acceleration, the catalyst temperature of the NOx catalyst converter 6 is still within the purification temperature window, and the selective reduction type NOx catalyst in the NOx catalyst converter 6 is activated. Hence, the NOx in the exhaust gas is reduced or decomposed and purified by the NOx catalyst converter 6. The NOx is generated in large amount in the operating state of acceleration and, therefore, a large amount of HC is required in order to purify by reducing or decomposing with the selective reduction type Nox catalyst. However, as described above, the HC which has been desorbed from the reductant HC absorbing device 4 is supplied to the NOx catalyst converter 6 in addition to the reductant injected from the injection nozzle 8. Thus, the NOx generated in large amount in the operating state of acceleration can be purified with certainty.

[Second Embodiment]

Figure 4:
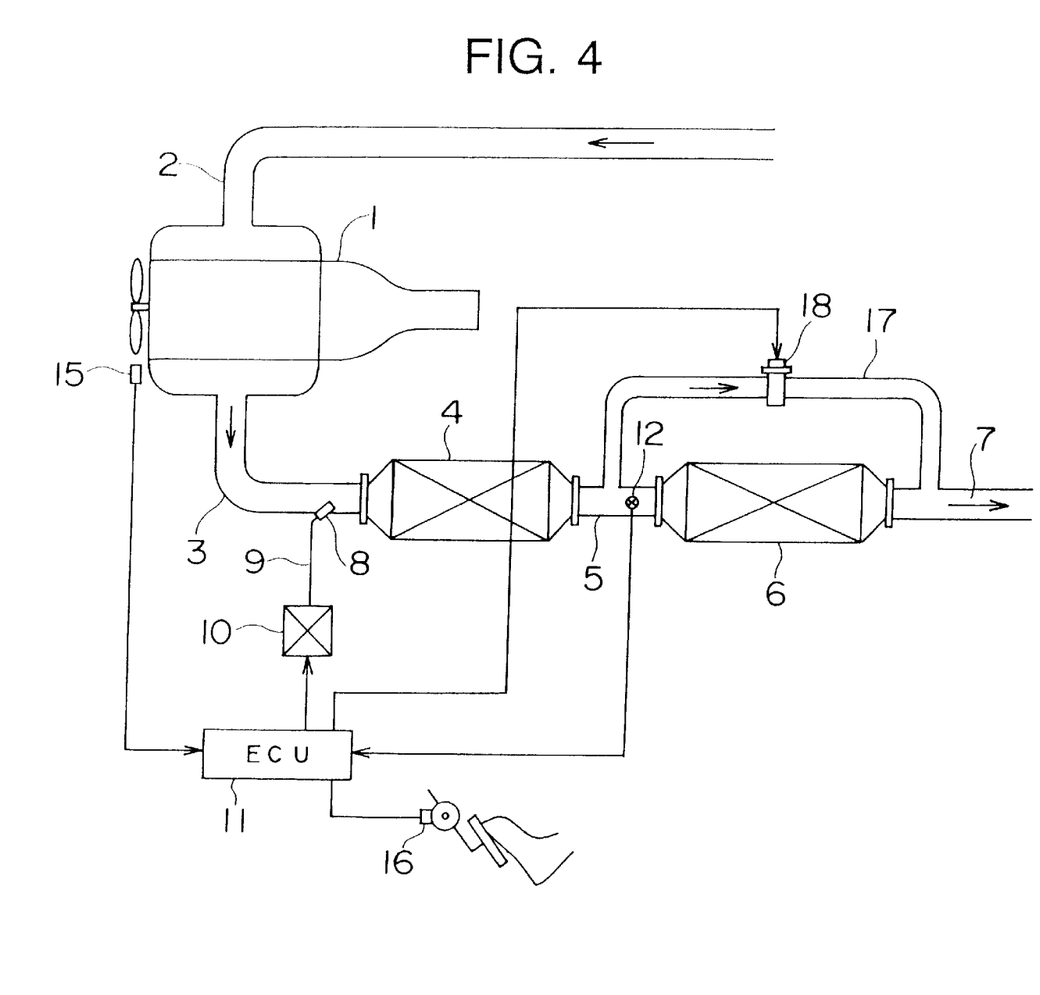
FIG. 4 is a schematic diagram showing a configuration of the exhaust gas purifying apparatus for the internal combustion engine in a second embodiment of the present invention.

FIG. 4 is a schematic diagram showing a configuration in a second embodiment of the exhaust gas purifying apparatus for the internal combustion engine according to the present invention.

In the first embodiment, when the inlet gas temperature T of the NOx catalyst converter 6 is lowered to a temperature lower than the set temperature $T_0$, an opening degree of the EGR valve 14 is corrected to be increased in order to prevent the catalyst temperature of the NOx catalyst converter 6 from being lowered to a temperature lower than the purification temperature window in the operating state of deceleration. Thereby, a flow rate of the exhaust gas which flows into the NOx catalyst converter 6 is decreased and lowering of the catalyst temperature is suppressed. On the other hand, in the second embodiment, a bypass pipe 17 which bypasses the NOx catalyst converter 6 is provided, and, further, a bypass valve 18 which controls a bypass flow rate is disposed in the bypass pipe 17. With such an arrangement, part of the exhaust gas is made to flow through the bypass pipe 17 and thereby the flow rate of the exhaust gas which flows into the NOx catalyst converter 6 is decreased. Besides, an opening degree of the bypass valve 18 is controlled by the ECU 11 and thereby the flow rate of the exhaust gas which flows into the NOx catalyst converter 6 is controlled, so that suppression of lowering of the catalyst temperature is realized. In this embodiment, the exhaust gas flow rate limiting means (catalyst temperature lowering suppression means) is realized by a combination of the bypass pipe 17, the bypass valve 18 and the ECU 11 which controls the bypass valve 18.

Since the other constituting elements and the operation of this embodiment are same as that of the first embodiment, the same constituents as those in the first embodiment are indicated by the same reference numerals and description thereof is omitted.

In the mean time, while the EGR valve 14 is not used in the embodiment shown in FIG. 4, it is natural that the EGR valve 14 may additionally be provided in this embodiment.

[Third Embodiment]

Figure 5:
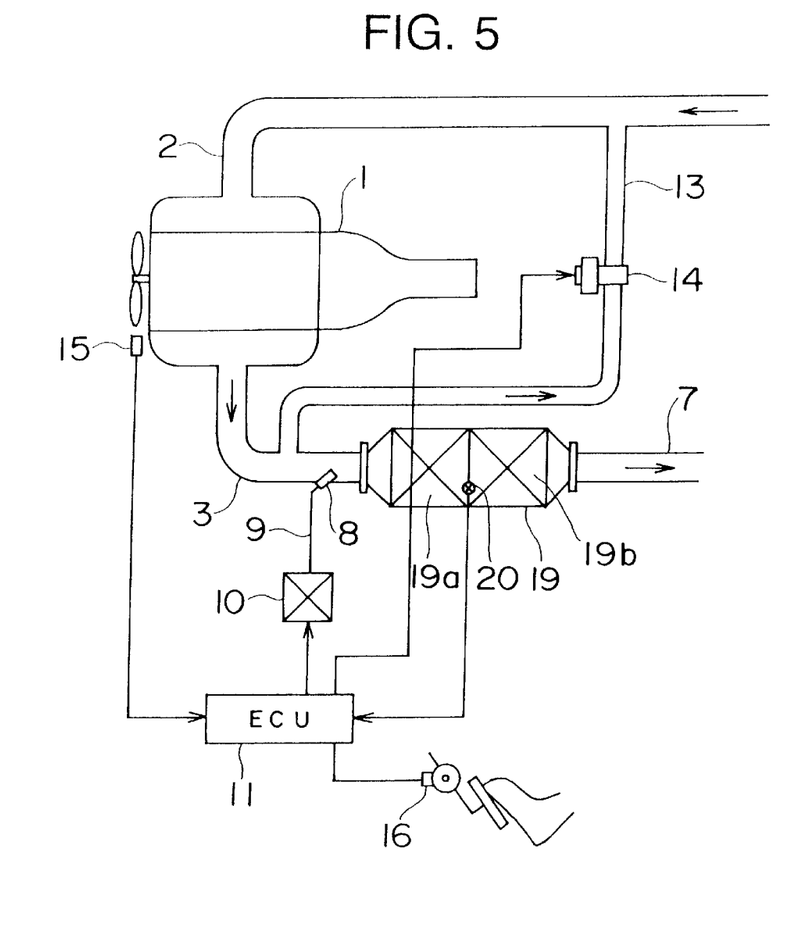
FIG. 5 is a schematic diagram showing a configuration of the exhaust gas purifying apparatus for the internal combustion engine in a third embodiment of the present invention.

FIG. 5 is a schematic diagram showing a configuration in a third embodiment of the exhaust gas purifying apparatus for the internal combustion engine according to the present invention.

In the first embodiment, the HC absorbing device 4 and the NOx catalyst converter 6 are completely separated, and they are connected by the exhaust pipe 5, but, in the third embodiment, an HC absorbing section 19a and a NOx catalyst purifying section 19b are accommodated in the upstream side and the downstream side of a single vessel 19 and a gas temperature sensor 20 is disposed between the HC absorbing section 19a and the NOx purifying section 19b. Besides, in the third embodiment, since the HC absorbing section 19a and the NOx purifying section 19b are accommodated in one vessel 19, the air intake pipe 2 and the exhaust pipe 3 are connected by the exhaust gas recycling pipe 13. The gas temperature sensor 20 corresponds to the inlet gas temperature sensor 12 of the first embodiment.

In the third embodiment, too, similarly in the case of the first embodiment, it is preferable that the selective reduction type NOx catalyst accommodate in the HC absorbing section 19a uses a carrier which is easy to absorb and desorb the HC, and the selective reduction type NOx catalyst accommodated in the NOx catalyst purifying section 19b uses a carrier with a strong absorption of HC for retention.

However, even when absolutely the same selective reduction type NOx catalysts are accommodated in both the HC absorbing section 19a and the NOx purifying section 19b, the present invention can be achieved and efficient purification of NOx can be performed. The reason why is that the HC which was absorbed in the selective reduction type NOx catalyst of the HC absorbing section 19a when the exhaust gas temperature was lowered is desorbed from the HC absorbing section 19a when the exhaust gas temperature is raised, and the desorbed HC is then supplied to the selective reduction type NOx catalyst of the NOx purifying section 19b at the downstream, and, in addition, the catalyst temperature of the NOx purifying section 19b is kept within the purification temperature window even in the operating state of deceleration.

Since the other constituting elements and the operation of this embodiment are same as in the case of the first embodiment, the same constituents as those in the first embodiment are indicated by the same reference numerals and description thereof is omitted.

[Other Embodiments]

In the above described embodiments, the HC (specifically, the light oil) is supplied as the reductant into the exhaust gas, but, instead, urea ($CO(NH_2)_2$), ammonia or the like may be used as the reductant.

According to the exhaust gas purifying apparatus for the internal combustion engine according to the present invention, a selective reduction type NOx catalyst is provided in an exhaust gas passageway, an absorbent which absorbs and desorbs a reductant is disposed in an upstream region of the selective reduction type NOx catalyst, and, further provided is catalyst temperature lowering suppression means for suppressing lowering of the temperature of the selective reduction type NOx catalyst when a load on the internal combustion engine is reduced. Thus, the catalyst temperature of the selective reduction type NOx catalyst can be confined within the purification temperature window even when the load on the internal combustion engine is reduced and, thereby, a large quantity of NOx which is generated when the load on the internal combustion engine is increased can be reduced and purified.

What is claimed is:

1. An exhaust gas purifying apparatus for an internal combustion engine comprising:

a selective reduction type $NO_x$ catalyst disposed in an exhaust gas passageway of the internal combustion engine, said catalyst reduces or decomposes NOX in the presence of hydrocarbon in an ambient atmosphere with excessive oxygen;

an absorbent which absorbs and desorbs a reductant provided in an upstream region of the selective reduction type $NO_x$ catalyst; and catalyst temperature lowering suppression means for suppressing lowering of a temperature of the selective reduction type $NO_x$ catalyst when a load on the internal combustion engine is reduced, wherein:

said catalyst temperature lowering suppression means is an exhaust gas flow rate limiting means for suppressing a flow rate of an exhaust gas which flows into the selective reduction type $NO_x$ catalyst.

2. An exhaust gas purifying apparatus for an internal combustion engine according to claim 1, wherein a carrier for the selective reduction type NOx catalyst is more difficult to desorb the reductant therefrom than a carrier of the absorbent.

* * * * *

UNITED STATES PATENT AND TRADEMARK OFFICE
CERTIFICATE OF CORRECTION

PATENT NO.    : 6,209,317 B1
DATED         : April 3, 2001
INVENTOR(S)   : Shinya Hirota Page 1 of 1

It is certified that error appears in the above-identified patent and that said Letters Patent is hereby corrected as shown below:

<u>Column 4,</u>
Line 19, change "engine land" to -- engine 1 and --.

Signed and Sealed this

Ninth Day of April, 2002

Attest:

Attesting Officer

JAMES E. ROGAN
*Director of the United States Patent and Trademark Office*